United States Patent
Dolker et al.

(10) Patent No.: US 7,182,064 B2
(45) Date of Patent: Feb. 27, 2007

(54) METHOD FOR REGULATING THE ROTATIONAL SPEED OF AN INTERNAL COMBUSTION ENGINE

(75) Inventors: Armin Dolker, Immenstaad (DE); Franz Butscher, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 18 days.

(21) Appl. No.: 10/542,502

(22) PCT Filed: Jan. 20, 2004

(86) PCT No.: PCT/EP2004/000376

§ 371 (c)(1),
(2), (4) Date: Jul. 15, 2005

(87) PCT Pub. No.: WO2004/065773

PCT Pub. Date: Aug. 5, 2004

(65) Prior Publication Data

US 2006/0118083 A1 Jun. 8, 2006

(30) Foreign Application Priority Data

Jan. 22, 2003 (DE) ................................ 103 02 263

(51) Int. Cl.
*F02D 31/00* (2006.01)
(52) U.S. Cl. .................. 123/352; 123/357; 123/339.19
(58) Field of Classification Search ................ 123/357, 123/350, 352, 198 D, 339.12, 339.19, 339.2; 702/96, 142
See application file for complete search history.

(56) References Cited

U.S. PATENT DOCUMENTS

| 4,646,697 A | * | 3/1987 | Grob et al. ............. 123/406.23 |
| 5,067,461 A | * | 11/1991 | Joachim et al. ............. 123/357 |
| 5,806,012 A | * | 9/1998 | Maki et al. .................. 701/104 |
| 5,819,705 A | * | 10/1998 | Scherer et al. .............. 123/357 |

(Continued)

FOREIGN PATENT DOCUMENTS

DE 199 37 139 C1 4/2001

(Continued)

*Primary Examiner*—Carl S. Miller
(74) *Attorney, Agent, or Firm*—Klaus P. Stoffel; Wolff & Samson PC (57) ABSTRACT

A method for closed-loop speed control of an internal combustion engine that is provided as a generator drive or a marine propulsion unit, including the steps of: computing a first control deviation (dR1) from a speed variance comparison; computing a first set injection quantity (qV0) from the first control deviation (dR1) by a speed controller; determining a second set injection quantity (qV) from the first set injection quantity (qV0) and another input variable (E) by a minimum value selector for the closed-loop speed control of the internal combustion engine, wherein in a first, steady operating state of the internal combustion engine, the input variable (E) corresponds to a first injection quantity (qV1) (E=qV1), which is computed via a first characteristic curve, and in a second, dynamic operating state of the internal combustion engine, the input variable (E) corresponds to a second injection quantity (qV2) (E=qV2), which is computed via a second characteristic curve; and changing from the first characteristic curve to the second characteristic curve when a changeover condition is satisfied.

11 Claims, 6 Drawing Sheets

U.S. PATENT DOCUMENTS

| | | | |
|---|---|---|---|
| 6,065,446 A * | 5/2000 | Engl et al. | 123/325 |
| 6,079,396 A * | 6/2000 | Ament et al. | 123/674 |
| 6,152,107 A | 11/2000 | Barnes et al. | |
| 6,397,821 B1 | 6/2002 | Spägele et al. | |
| 6,510,691 B1 * | 1/2003 | Schmid | 60/602 |
| 2002/0132699 A1 | 9/2002 | Bellinger | |

FOREIGN PATENT DOCUMENTS

| | | |
|---|---|---|
| EP | 1 065 364 A1 | 1/2001 |
| EP | 1 348 590 A2 | 10/2003 |

\* cited by examiner

METHOD FOR REGULATING THE ROTATIONAL SPEED OF AN INTERNAL COMBUSTION ENGINE

PRIORITY CLAIM

This is a 35 U.S.C. §371 National Stage of International Application No. PCT/EP2004/000376, filed on Jan. 20, 2004. Priority is claimed on that application and on the following application:
Country: Germany, Application No. 103 02 263.5, Filed: Jan. 22, 2003.

BACKGROUND OF THE INVENTION

The invention concerns a method for the closed-loop speed control of an internal combustion engine.

An internal combustion engine that is used as a marine propulsion unit or a generator drive is usually operated in a closed-loop speed control system. The actual speed of the crankshaft is usually detected as the controlled variable. It is compared with a reference input, i.e., a set speed. The resulting control deviation is converted by a speed controller to a correcting variable, i.e., a set injection quantity. The amount of fuel injected is set by the correcting variable. To stabilize the closed-loop speed control system, a one-revolution or two-revolution filter is provided in the feedback path.

SUMMARY OF THE INVENTION

An internal combustion engine of this type is often operated in a steady state, i.e., at a constant speed. For example, 1,500 rpm corresponds to a power frequency of 50 Hz in a generator application. Hereinafter, the steady operating state will be referred to as the first operating state.

Due to external influences, a dynamic operating state can arise, for example, in the case of a load rejection or in the case of broaching of the ship's propulsion unit. Hereinafter, the dynamic operating state will be referred to as the second operating state. For the second operating state, industry standards define acceptable speed increases in the event that a second operating state develops, for example, 10% of the rated speed.

DE 199 37 139 C1 describes a method for the open-loop control of an internal combustion engine, in which the injection start is shifted towards late when a significant load change on the power takeoff is detected. Thus, in this method, when the second operating state is detected, an increase in the speed is counteracted by an open-loop control system. Consequently, the speed increase is not controlled solely by the speed controller. As an additional measure, a speed limitation curve for reducing the set injection quantity is provided in the injection start input-output map.

The same prior art also describes the arrangement of a minimum value selector between the speed controller and the controlled system. The set injection quantity computed by the speed controller is compared with another input variable by the minimum value selector.

This prior-art method has proven effective in practice. However, it is attended by the problem that the speed range in the first operating state is limited by the speed limitation curve.

Therefore, the objective of the invention is to develop a method for closed-loop speed control that allows greater freedom of selection in the first operating state in accordance with industry standards.

The invention provides that, in the first operating state of the internal combustion engine, the other input variable corresponds to the minimum value selection of a first injection quantity, which is computed by means of a first characteristic curve. In the second operating state of the internal combustion engine, the other input variable corresponds to the minimum value selection of a second injection quantity, which is computed by means of a second characteristic curve, such that a change is made from the first to the second characteristic curve when a changeover condition is satisfied. The changeover condition is satisfied when a first control deviation becomes negative and falls below a limit. A negative control deviation occurs whenever the controlled variable, i.e., the actual speed of the internal combustion engine, becomes greater than the set point assignment. When the changeover condition is satisfied, the second characteristic curve is initialized with the value of the first injection quantity of the first characteristic curve at the time of the changeover. After that, the second characteristic curve is used to reduce the second injection quantity to zero or to a default value, starting from the initialization value, if the actual speed increases further.

The greater freedom of selection in the first operating state is achieved by the invention by virtue of the fact that the first characteristic contains no speed limitation curve or a speed limitation curve that is shifted towards higher speed values. In the first operating state, any desired speed can be set by the user. Speed limitation occurs only when the second operating state is detected. Consequently, the default settings of the industry standards are maintained by the second characteristic curve.

Since the speed limitation in the second operating state, as in the prior art, is realized by an open-loop control system, optimization of the speed controller parameters for the load rejection is not necessary. Therefore, the speed controller can be optimized exclusively for the first operating state by the manufacturer of the internal combustion engine. Therefore, robust parameters can be used for the speed controller.

BRIEF DESCRIPTION OF THE DRAWINGS

The preferred embodiments of the invention are illustrated in the drawings.

DETAILED DESCRIPTION OF THE INVENTION

Figure 1:
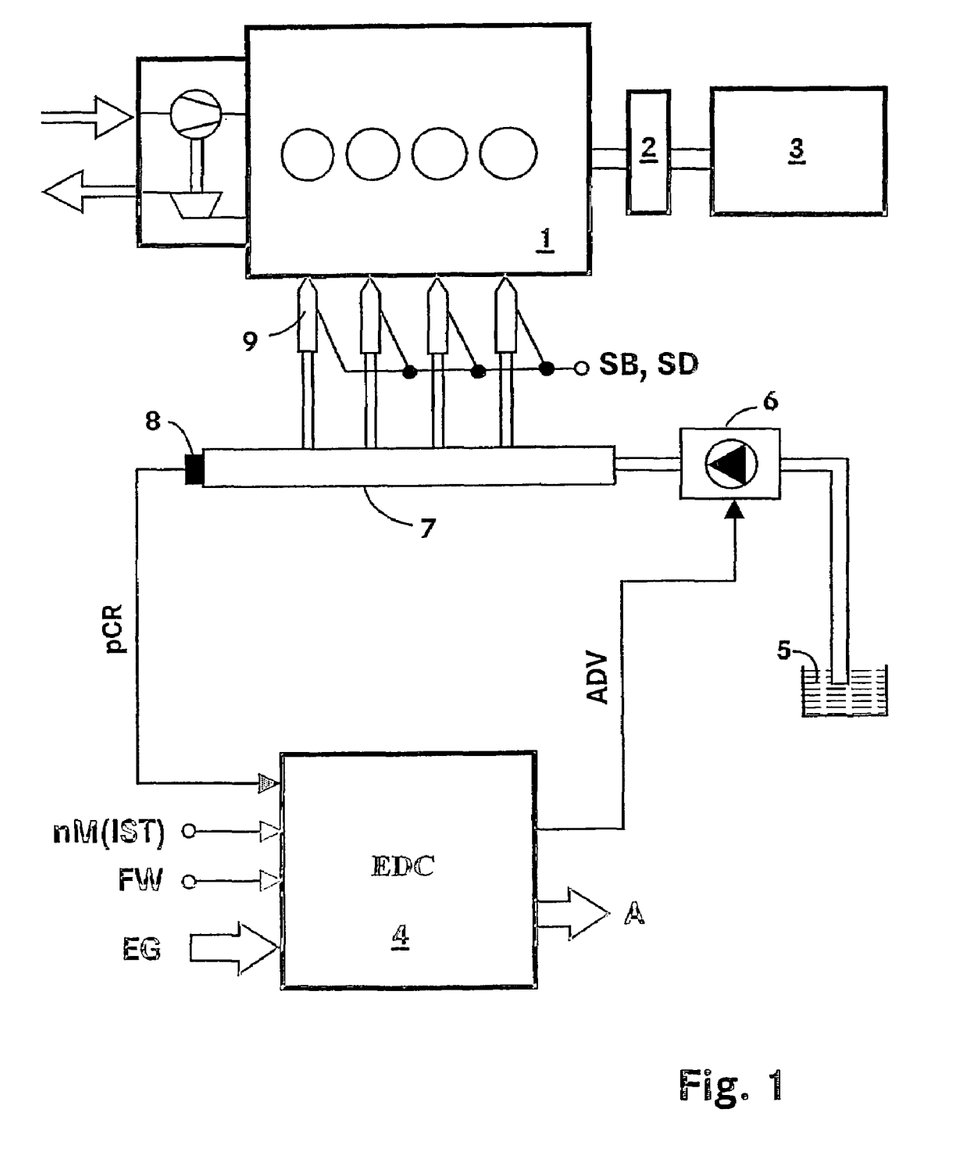
FIG. 1 shows a system diagram.

FIG. 1 shows a system diagram of a system that consists of an internal combustion engine 1 with an engine load 3. The internal combustion engine 1 drives the engine load 3 via a shaft with a coupling 2. In the illustrated internal combustion engine 1, the fuel is injected by a common-rail injection system. This injection system comprises the following components: pumps 6 with a suction throttle for conveying the fuel from a fuel tank 5, a rail 7 for storing the fuel, and injectors 9 for injecting the fuel from the rail 7 into the combustion chambers of the internal combustion engine 1.

The internal combustion engine 1 is automatically controlled by an electronic control unit (EDC) 4. The electronic control unit 4 contains the usual components of a microcomputer system, for example, a microprocessor, interface adapters, buffers, and memory components (EEPROM, RAM). The relevant operating characteristics for the operation of the internal combustion engine 1 are applied in the memory components in input-output maps/characteristic curves. The electronic control unit 4 uses these to compute the output variables from the input variables. FIG. 1 shows the following input variables as examples: a rail pressure pCR, which is measured by means of a rail pressure sensor 8, an actual speed signal nM(IST) of the internal combustion engine 1, an input variable EG, and a signal FW for the setting of the desired power by the operator. In a motor vehicle application, this corresponds to the position of the accelerator pedal. Examples of input variables EG are the charge air pressure of a turbocharger and the temperatures of the coolant/lubricant and the fuel.

As output variables of the electronic control unit 4, FIG. 1 shows a signal ADV for controlling the pumps 6 with a suction throttle and an output variable A. The output variable A is representative of the other control signals for automatically controlling the internal combustion engine 1, for example, the injection start SB and the injection duration SD. The set injection quantity qV is defined by the injection start SB and the injection duration SD.

Figure 2:
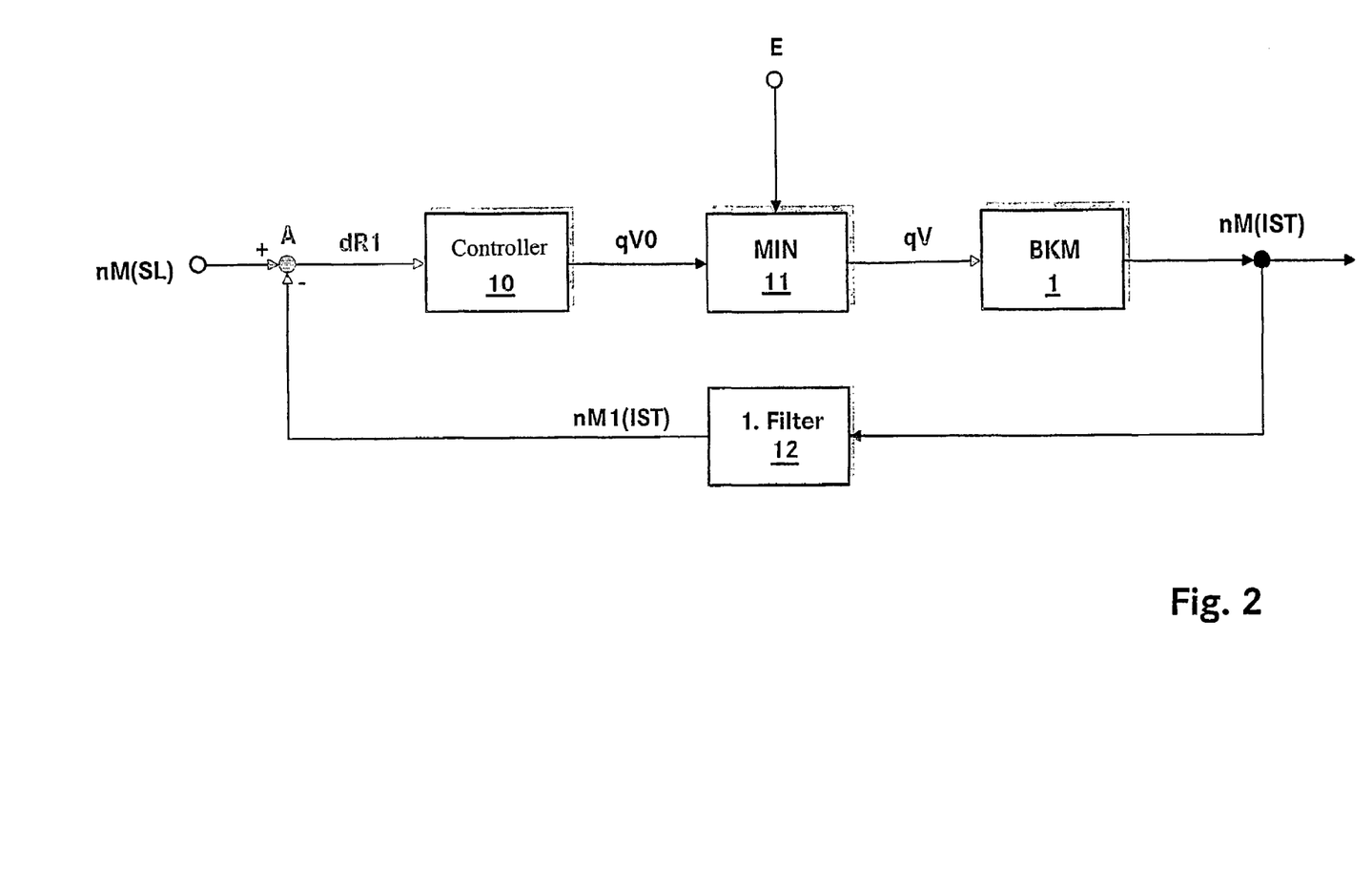
FIG. 2 shows a prior-art closed-loop speed control system.

FIG. 2 shows a prior-art closed-loop speed control system. The input variables of the closed-loop control system are the reference input, which corresponds to a set speed, and another input variable E. The input variable E is explained in connection with FIGS. 3 and 4. The output variable of the closed-loop speed control system, i.e., the controlled variable, corresponds to the raw actual speed nM(IST). This is converted by a first filter 12 to a first filtered actual speed nM1(IST). Hereinafter, this will be referred to as the first actual speed nM1(IST). The first filter 12 is arranged in the feedback path of the closed-loop speed control system. It is usually designed as a one-revolution or two-revolution filter. In the case of a two-revolution filter, the speed impulses of the crankshaft are detected over one operating cycle, i.e., 720°. The set speed nM(SL) and the first actual speed nM1(IST) are compared at a comparison point A. The resulting first control deviation dR1 is converted to a first set injection quantity qV0 by a speed controller 10. The first set injection quantity qV0 and the other input variable E are compared by a minimum value selector 11. The output variable of the minimum value selector 11 corresponds to a second set injection quantity qV. This corresponds either to the value qV0 or the input variable E. The second set injection quantity qV is supplied as an input variable to the controlled system, in this case the internal combustion engine 1. The closed-loop control system is thus closed.

Figure 3:
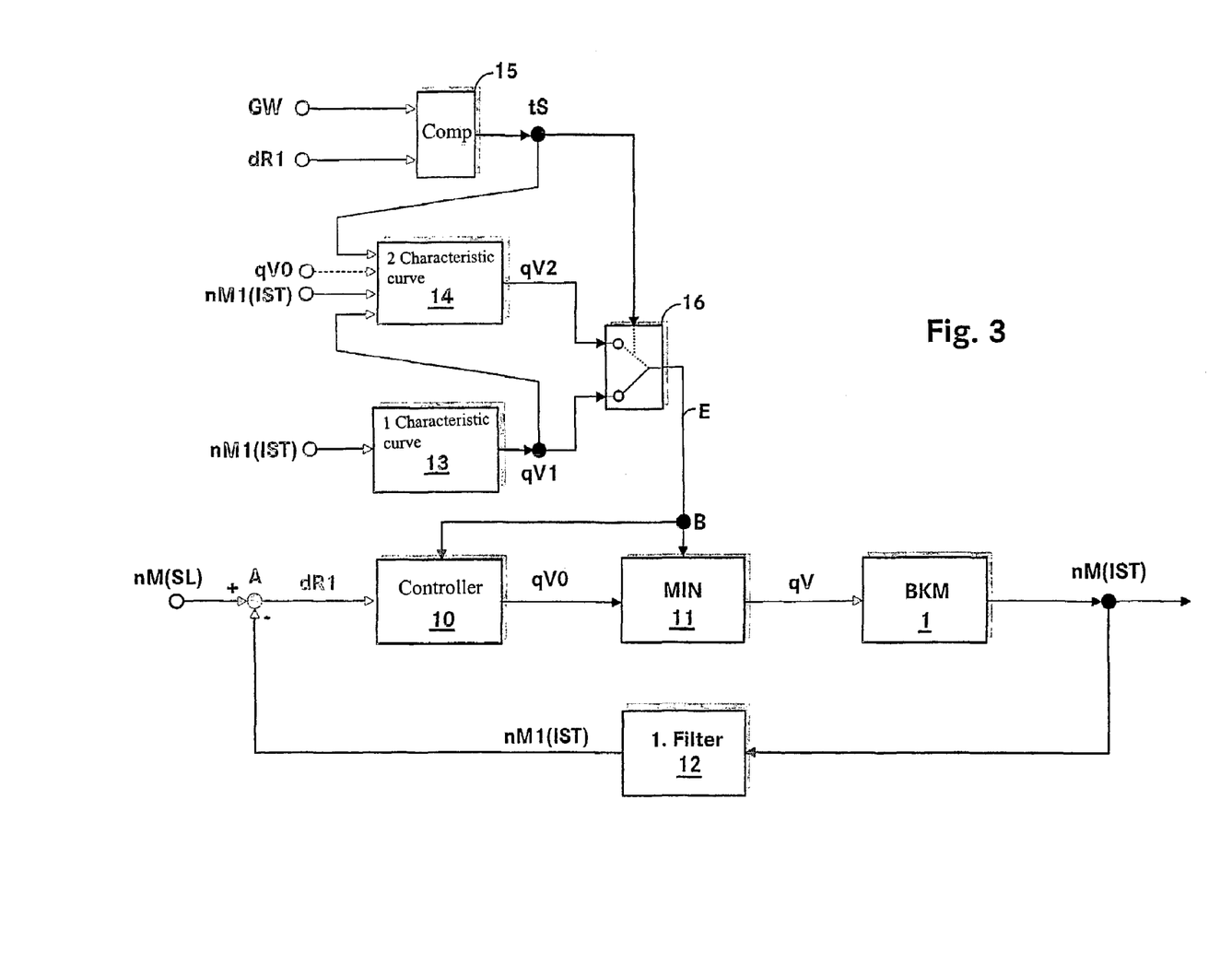
FIG. 3 shows a first functional block diagram (first embodiment).
Figure 6:
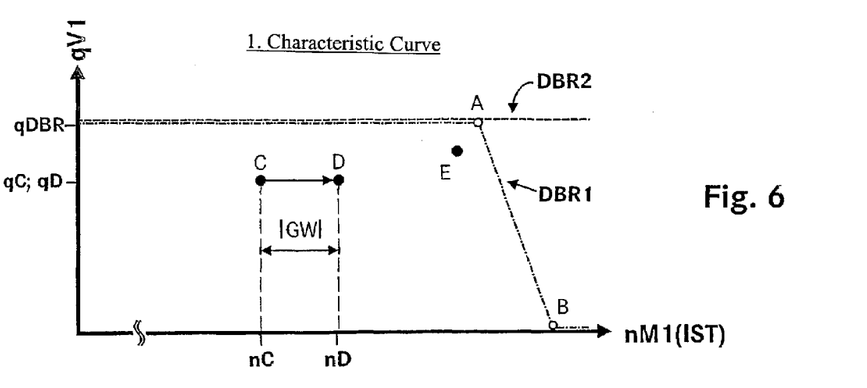
FIG. 6 shows a first characteristic curve.

FIG. 3 shows a first embodiment of the invention as a functional block diagram. The reference numbers 1 and 10 to 12 represent the closed-loop speed control system described above. The invention now provides that the input variable E of the minimum value selector 11 is determined by a first characteristic curve 13 or a second characteristic curve 14. The input variable of the first characteristic curve 13 corresponds to the first actual speed nM1(IST). A first injection quantity qV1 is assigned to the input variable by the first characteristic curve 13. The first characteristic curve 13 is shown in FIG. 6 and is explained in connection with FIG. 6. The input variables of the second characteristic curve are: the first injection quantity qV1, the first actual speed nM1(IST), and a changeover time signal tS. The first injection quantity qV1, i.e., the output variable of the first characteristic curve 13, is supplied to the second characteristic curve 14 by a corresponding feedback path. A second injection quantity qV2 is computed by the second characteristic curve 14 as a function of the input variables. The first injection quantity qV1 and the second injection quantity qV2 are supplied to a switch 16. The state of the switch 16 is defined by the changeover time signal tS. This in turn is computed by a comparator 15 from the first control deviation dR1 and a limit GW. At a branch point B, the output variable of the switch 16 is additionally supplied to the speed controller 10. This signal path serves to limit the integral component of the speed controller 10.

The system works as follows: In the first operating state, the switch 16 is in the illustrated position. In this operating state, the input variable E of the minimum value selector 11 is determined by the first characteristic curve 13. Consequently, the input variable E corresponds to the value of the first injection quantity qV1. When the changeover condition is satisfied, the comparator 15 sets the signal tS. The changeover condition is satisfied when the first control deviation dR1 becomes negative and falls below the limit GW. A typical value for the limit GW is minus 80 revolutions per minute. When the signal tS is set, the switch 16 changes its position to the position indicated by the dotted line. At the same time, the second characteristic curve 14 is initialized with the last computed value qV1(tS) of the first injection quantity. Starting from the initialization value qV1(tS), the second injection quantity qV2 is reduced to the value zero by the second characteristic curve 14 if the first actual speed nM1(IST) continues to increase. As soon as the second injection quantity qV2 falls below the value of the first set injection quantity qV0, the second injection quantity qV2 is set as the determining value for the second set injection quantity qV by means of the minimum value selector 11. The second characteristic curve 14 thus causes a decreasing injection quantity to be injected into the combustion chambers of the internal combustion engine 1 with increasing first actual speed. This limits the speed increase. Naturally, it is possible to reduce the second injection quantity qV2 only to a minimum value instead of to zero.

Alternatively, it is provided that, when the changeover condition is satisfied, the second characteristic curve is initialized with the last computed value qV0(ts) of the first set injection quantity qV0 at the changeover time tS. This alternative is indicated in FIG. 3 by the broken line. In this alternative, the feedback path of the first characteristic curve 13 to the second characteristic curve is eliminated.

Figure 4:
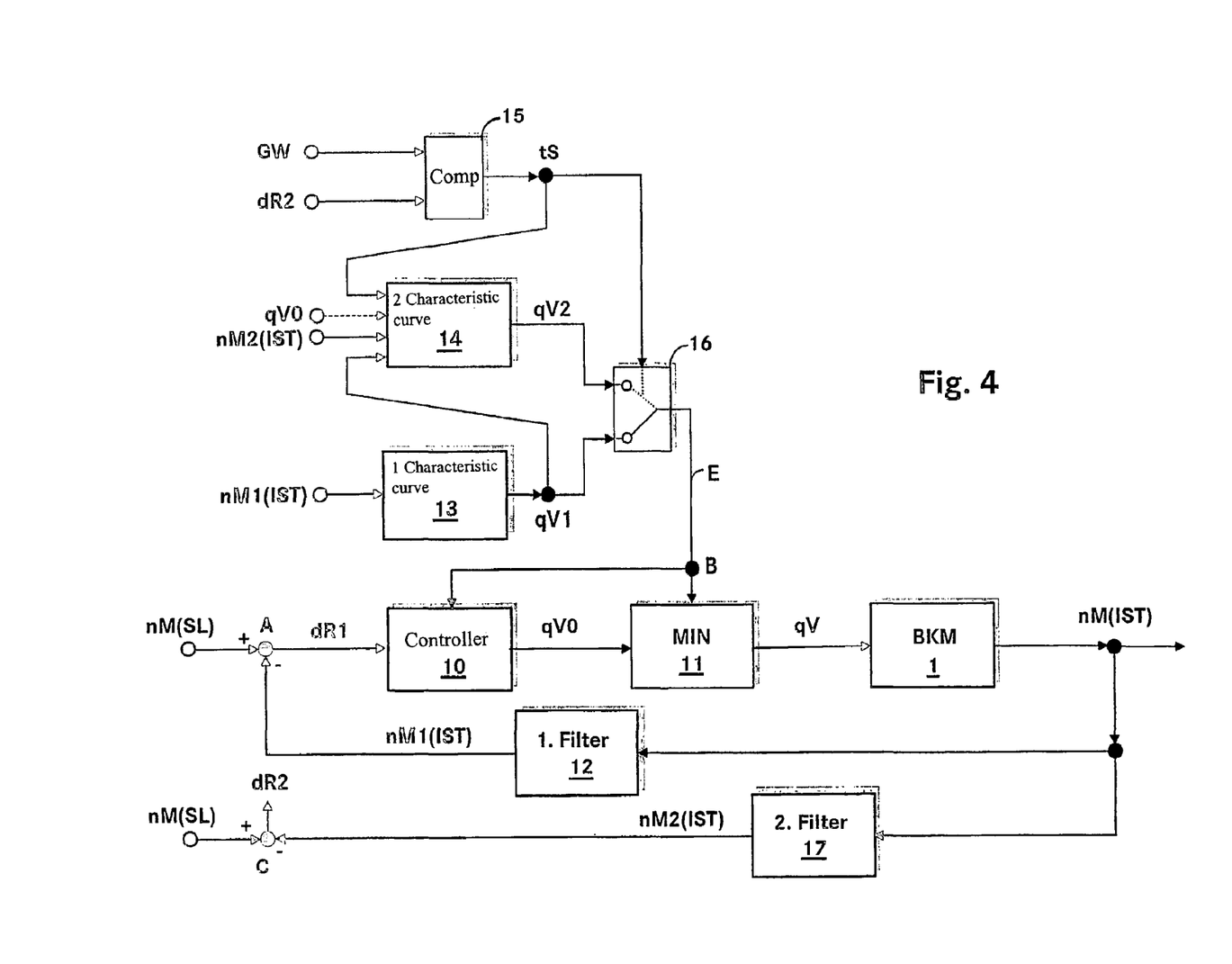
FIG. 4 shows a second functional block diagram (second embodiment).

FIG. 4 shows a second embodiment of the invention as a functional block diagram. This embodiment differs from the embodiment shown in FIG. 3 by the addition of a second filter 17. This filter 17 computes a second filtered actual speed nM2(IST) from the unfiltered actual speed nM(IST). Hereinafter, this will be referred to as the second actual speed. The second actual speed nM2(IST) is compared with the set speed nM(SL) at a point C. A second control deviation dR2 is computed in this way. The second control deviation dR2 is the input variable for the comparator 15. The second actual speed nM2(IST) is the input variable for the second characteristic curve 14. The second filter 17 detects a smaller crankshaft angle than the first filter 12. For example, the second filter detects an angle of 90°. A shorter reaction time to speed changes of the unfiltered actual speed nM(IST) is achieved in this way. The system otherwise works as described in connection with FIG. 3.

Figure 5:
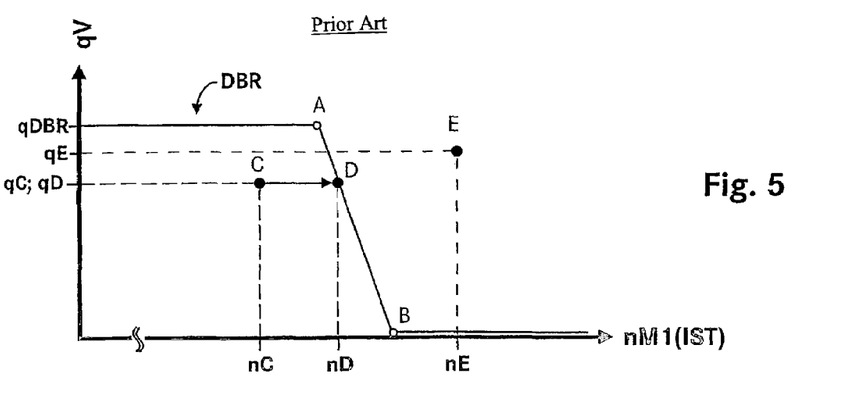
FIG. 5 shows a prior-art speed limitation curve.

FIG. 5 shows a prior-art speed limitation curve. The first actual speed nM1(IST) is plotted on the x-axis, and the set injection quantity qV is plotted on the y-axis. The speed limitation curve DBR is plotted as a solid line. The DBR curve comprises a linear segment parallel to the x-axis and a decreasing linear segment. The decreasing linear segment between points A and B will be referred to as the speed regulation curve. A first operating point is plotted at C. This point has the pair of values nC and qC. For a 50 Hz generator application, the speed value nC at operating point C corresponds to a speed value of 1,500 rpm.

The prior-art method proceeds as follows: Due to a load rejection, the first actual speed nM1(IST) increases from the speed value nC at point C towards point D. Point D lies on the speed regulation curve and has the pair of values nD and qD. When point D is reached, the set injection quantity qV is reduced from the value qD to the value zero along the speed regulation curve. Since the industry standards for the load rejection preset a speed increase of, for example, a maximum of 10% of the rated speed, in practice, the DBR curve is selected in such a way that this criterion is guaranteed to be maintained. At a speed value nC at point C of 1,500 rpm, this means that, for example, a value of 1,580 rpm is assigned to point D. The load rejection criteria are safely fulfilled by the DBR curve. However, this presents the problem that an operating point E with a speed value of nE cannot be set in the first state.

FIG. 6 shows the first characteristic curve 13. The input variable is the first actual speed nM1(IST). The output variable is the first injection quantity qV1. The first characteristic curve 13 is constructed in such a way that the speed regulation curve is eliminated or is shifted towards large speed values of the first actual speed nM1(IST). Reference symbol DBR1 identifies a speed regulation curve that is shifted towards high speed values. A curve DBR2 is plotted as a broken line in FIG. 6. This corresponds to the elimination of the speed regulation curve. In contrast to FIG. 5, operating point E is now located in the permissible range. Consequently, the operator of the internal combustion engine can set the engine to operating point E.

Figure 7:
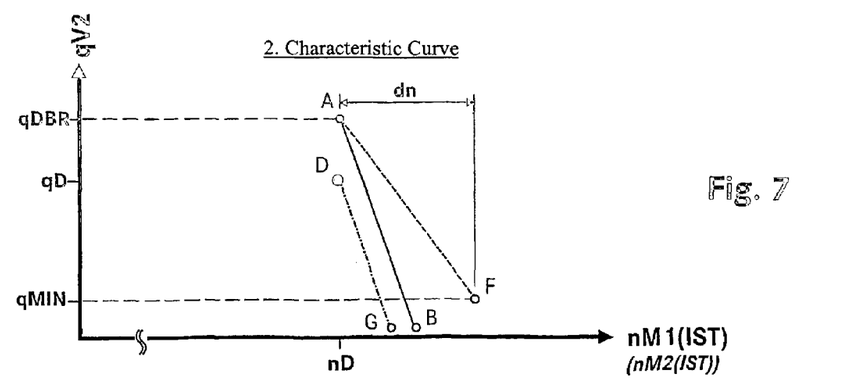
FIG. 7 shows a second characteristic curve.

FIG. 7 shows the second characteristic curve 14. The input variable is the first actual speed nM1(IST). The output variable is the second injection quantity qV2. FIG. 7 shows three alternative decreasing straight lines, corresponding to the curves AB, AF, and DG.

The function of the invention is explained with reference to FIGS. 6 and 7. The internal combustion engine is operated in the first operating state at operating point C. Due to a load rejection, the first actual speed nM1(IST) increases from operating point C towards D. At point D, the changeover condition is satisfied. The changeover condition is satisfied when the first control deviation dR1 becomes negative and falls below a limit GW, for example, minus 80 rpm. The value of this limit GW is plotted accordingly in FIG. 6. When the changeover condition is satisfied, the changeover is made from the first characteristic curve to the second characteristic curve (FIG. 7). The value qDBR of the first injection quantity qV1 at the changeover time tS is set as the initialization value for the second characteristic curve. Starting from this value qDBR, the second injection quantity qV2 is reduced. If the first actual speed nM1(IST) increases above the speed value nD of the operating point D, the second injection quantity qV2 is regulated according to one of the three speed regulation curves shown in FIG. 7. The second injection quantity qV2 is reduced to zero by the speed regulation curve with the points A and B (solid line). The second injection quantity qV2 is reduced to a value qMIN over a speed range dn by the speed regulation curve with the points A and F (broken line). In practice, the value qMIN is selected smaller than the idling injection quantity qLL. The second injection quantity qV2 is reduced to zero, starting at point D, value qD, by the speed regulation curve with the points D and G (dot-dash line). This speed regulation curve DG is used when, at the changeover time tS, the second characteristic curve is initialized with the value qV0(tS) of the first set injection quantity qV0. This corresponds to the alternatives drawn in FIGS. 3 and 4. In this example, the advantage is a faster reduction of the second injection quantity qV2.

The selection of the appropriate speed reduction curve is determined by the load that is being driven. Instead of the linear transient response used here, any desired function can be used. Naturally, it is also possible to set a larger value than the injection quantity qD as the initialization value. The second actual speed nM2(IST) is placed in parentheses on the x-axis in FIG. 7. The second actual speed nM2(IST) is the input variable of the second characteristic curve 14 when the second filter 17 is used (see FIG. 4).

Figure 8:
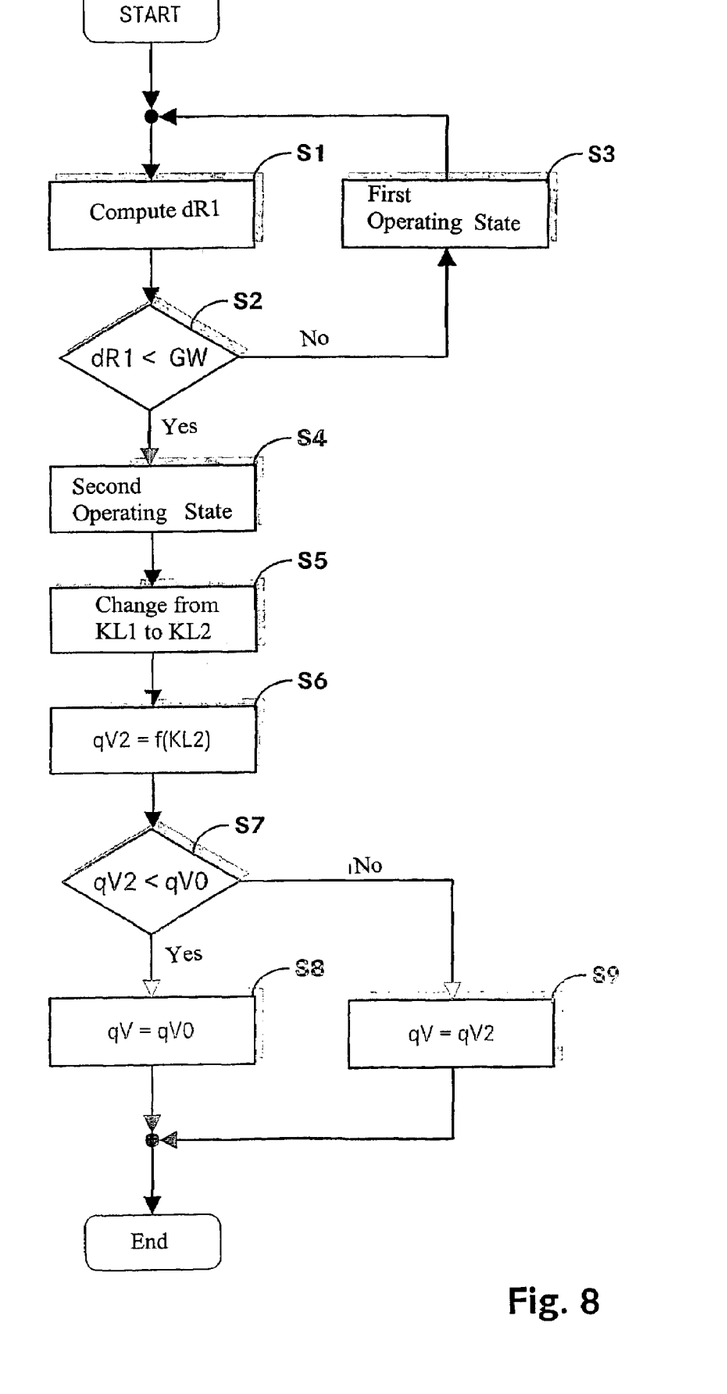
FIG. 8 shows a program flowchart.

FIG. 8 shows a program flowchart. At S1, the first control deviation dR1 is computed. A check is then made at S2 to determine whether the first control deviation dR1 is below the limit GW. If this is not the case, then control goes to S3, and the first operating state is set. If the first control deviation dR1 is negative and has fallen below the limit GW, then the changeover condition is satisfied. The second operating state is then set at S4, and the changeover from the first characteristic curve to the second characteristic curve is made at S5. To this end, the second characteristic curve is initialized with the value qV 1 (tS) of the first injection quantity qV1 at the changeover time tS. At S6, the second injection quantity qV2 is determined by the second characteristic curve in accordance with FIG. 7. A check is then made at S7 to determine whether the second injection quantity qV2 has fallen below the first set injection quantity qV0, which is computed by the speed controller from the first control deviation dR1. If this is not the case, then at S9 the second injection quantity qV2 remains dominant for the second set injection quantity qV, and the program flowchart ends. If the second injection quantity qV2 falls below the value of the first set injection quantity qV0 in step S7, then at step 8 the first set injection quantity is set as dominant for the second set injection quantity qV. When the second filter 17 is used in accordance with the functional block diagram in FIG. 4, the interrogation in step S2 is with respect to the second control deviation dR2.

The invention offers the following advantages:
the load rejection criteria are reliably maintained;
no limitation of the speed adjustment range in the first operating state;
the speed controller parameters do not have to be optimized to the load rejection behavior;
a robust design of the speed controller is possible;
optimum synchronism in the first operating state is achieved by the slow filtering (first filter);
free design of the steady-state DBR curve is possible.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A method for closed-loop speed control of an internal combustion engine that is provided as a generator drive or a marine propulsion unit, comprising the steps of: computing a first control deviation (dR1) from a speed variance comparison; computing a first set injection quantity (qV0) from the first control deviation (dR1) by a speed controller; determining a second set injection quantity (qV) from the first set injection quantity (qV0) and another input variable (E) by a minimum value selector for the closed-loop speed control of the internal combustion engine, wherein in a first, steady operating state of the internal combustion engine, the input variable (E) corresponds to a first injection quantity (qV1) (E=qV1), which is computed via a first characteristic curve, and in a second, dynamic operating state of the internal combustion engine, the input variable (E) corresponds to a second injection quantity (qV2) (E=qV2), which is computed via a second characteristic curve; and changing from the first characteristic curve to the second characteristic curve when a changeover condition is satisfied.

2. The method for closed-loop speed control in accordance with claim 1, wherein the changeover condition is satisfied when the first control deviation (dR1) becomes negative (dR1<0) and falls below a limit (GW) (dR1<GW).

3. The method for closed-loop speed control in accordance with claim 2, including initializing the second characteristic curve with a value (qV1(tS)) of the first injection quantity (qV1) at a changeover time (tS) when the changeover condition is satisfied.

4. The method for closed-loop speed control in accordance with claim 2, including initializing the second characteristic curve with a value (qV0(tS)) of the first set injection quantity (qV0) at a changeover time (tS) when the changeover condition is satisfied.

5. The method for closed-loop speed control in accordance with claim 4, including initializing the second characteristic curve with a larger value than the first set injection time (qV0) at the changeover time (tS) when the changeover condition is satisfied.

6. The method for closed-loop speed control in accordance with claim 2, including using the second characteristic curve to reduce the second injection quantity (qV2), starting from an initialization value, to zero (qV2=0) or to a default value (qMIN) according to a transient response (qV2=qMIN).

7. The method for closed-loop speed control in accordance with claim 6, wherein the default value (qMIN) is smaller than an idling injection quantity (qLL).

8. The method for closed-loop speed control in accordance with claim 1, further including a second control deviation (dR2) and the changeover condition is satisfied if the second control deviation (dR2) becomes negative (dR2<0) and falls below a limit (GW) (dR2<GW).

9. The method for closed-loop speed control in accordance with claim 8, wherein a first filtered actual speed (nM1(IST)) is a critical value for determining the first control deviation (dR1), and a second filtered actual speed (nM2(IST)) is a critical value for determining the second control deviation (dR2), such that the first filtered actual speed (nM1(IST)) and the second filtered actual speed (nM2(IST)) are computed from the actual speed (nM(IST)) of the internal combustion engine by a first filter and a second filter, respectively.

10. The method for closed-loop speed control in accordance with claim 9, wherein the first filter detects a larger crankshaft angle than the second filter.

11. The method for closed-loop speed control in accordance with claim 1, including setting the input variable (E) of the minimum value selector as a limiting value for an integral component of the speed controller.

* * * * *